United States Patent
Silva et al.

(10) Patent No.: US 10,053,241 B2
(45) Date of Patent: Aug. 21, 2018

(54) SYSTEMS AND METHODS FOR MULTI-SPACECRAFT DISTRIBUTED ASCENT

(71) Applicant: The Boeing Company, Chicago, IL (US)

(72) Inventors: Elvis Silva, Chicago, IL (US); Manuel Martinez-Lavin, Chicago, IL (US)

(73) Assignee: The Boeing Company, Chicago, IL (US)

(*) Notice: Subject to any disclaimer, the term of this patent is extended or adjusted under 35 U.S.C. 154(b) by 26 days.

(21) Appl. No.: 15/366,548

(22) Filed: Dec. 1, 2016

(65) Prior Publication Data

US 2018/0155065 A1  Jun. 7, 2018

(51) Int. Cl.
*B64G 1/24* (2006.01)
*B64G 1/10* (2006.01)

(52) U.S. Cl.
CPC .......... *B64G 1/242* (2013.01); *B64G 1/1085* (2013.01)

(58) Field of Classification Search
CPC .............................. B64G 1/242; B64G 1/1085
See application file for complete search history.

(56) References Cited

U.S. PATENT DOCUMENTS

| | | | |
|---|---|---|---|
| 5,810,297 A | 9/1998 | Basuthakur et al. | |
| 5,884,866 A * | 3/1999 | Steinmeyer | B64G 1/002 244/137.1 |
| 5,961,077 A * | 10/1999 | Koppel | B64G 1/242 244/158.5 |
| 6,050,525 A | 4/2000 | Drake | |
| 2006/0016934 A1 * | 1/2006 | Sharer | B64G 1/1085 244/158.4 |
| 2009/0230249 A1 * | 9/2009 | Geneste | B64G 1/007 244/158.5 |
| 2016/0311557 A1 * | 10/2016 | Fuller | B64G 1/005 |
| 2017/0043885 A1 * | 2/2017 | Marchandise | B64G 1/007 |

FOREIGN PATENT DOCUMENTS

| | | |
|---|---|---|
| EP | 0 843 245 | 5/1998 |
| WO | 2015/162370 | 10/2015 |

OTHER PUBLICATIONS

Extended European Search Report prepared by the European Patent Office in Application No. 17 19 6336, dated Apr. 17, 2018.

* cited by examiner

*Primary Examiner* — Calvin Cheung
(74) *Attorney, Agent, or Firm* — McDonnell Boehnen Hulbert & Berghoff LLP

(57) ABSTRACT

Example methods and systems of deploying a constellation of spacecraft are described. An example method includes releasing a cluster of spacecraft from a launch vehicle at a first orbit, separating spacecraft in the cluster of spacecraft from each other to minimize overlap of visibility periods from a ground station, and raising each of the spacecraft as separated simultaneously in a synchronized ascent to a respective final orbit. An example system includes a cluster of spacecraft in orbit at a first orbit, and a ground station in communication with spacecraft of the cluster of spacecraft when the spacecraft of the cluster are visible to the ground station. The ground station commands each spacecraft to separate from each other and to raise in altitude as separated simultaneously in a synchronized ascent to a respective final orbit.

20 Claims, 12 Drawing Sheets

SIMULTANEOUSLY RAISING EACH OF THE SPACECRAFT FROM ABOUT A SAME STARTING ORBIT, DIFFERENT THAN THE FIRST ORBIT, WITH THE RELATIVE PHASING SEPARATING EACH OF THE SPACECRAFT TO EACH OTHER RESULTING IN THE RELATIVE PHASING REMAINING ONCE EACH OF THE SPACECRAFT ARRIVES AT THE RESPECTIVE FINAL ORBIT

222

SEPARATING THE SPACECRAFT SUCH THAT ONLY ONE SPACECRAFT IS VISIBLE TO THE GROUND STATION AT ANY GIVEN TIME

FIG. 17 — 214

SEPARATING THE SPACECRAFT IN THE CLUSTER RELATIVE TO EACH OTHER TO CAUSE A SEPARATION PHASE FROM SPACECRAFT TO SPACECRAFT

FIG. 18 — 216

SENDING A TIMED COMMAND TO EACH OF THE SPACECRAFT, WHEN VISIBLE TO THE GROUND STATION, INDICATING TO MANEUVER TO THE RESPECTIVE FINAL ORBIT, AND THE TIMED COMMAND INDICATES WHEN TO BEGIN THE MANEUVER IN ORDER TO ACHIEVE THE SYNCHRONIZED ASCENT AND TO MAINTAIN THE RELATIVE PHASING OF EACH SPACECRAFT TO EACH OTHER

FIG. 19 — 218

SENDING EACH SPACECRAFT A START TIME FOR THE SYNCHRONIZED ASCENT

FIG. 20 — 220

SIMULTANEOUSLY RAISING EACH OF THE SPACECRAFT FROM ABOUT A SAME STARTING ORBIT, DIFFERENT THAN THE FIRST ORBIT, WITH THE RELATIVE PHASING SEPARATING EACH OF THE SPACECRAFT TO EACH OTHER RESULTING IN THE RELATIVE PHASING REMAINING ONCE EACH OF THE SPACECRAFT ARRIVES AT THE RESPECTIVE FINAL ORBIT

FIG. 21 — 222

COMMUNICATING WITH EACH SPACECRAFT VIA A LINE-OF-SIGHT COMMUNICATION

— 224

COMMUNICATING WITH EACH SPACECRAFT ONE AT A TIME

FIG. 22 — 226

THE GROUND STATION INDIVIDUALLY COMMANDING THE SPACECRAFT TO SEPARATE AND THEN RAISE

FIG. 23 — 228

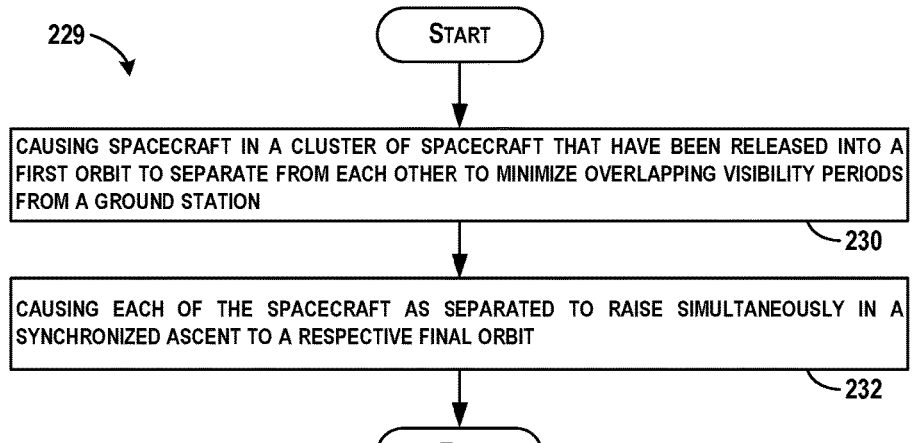

ns, such as groups of satellites, into separate orbits requires numerous launches which can be costly. Alternatively, if many spacecraft comprising a constellation are launched from a single launch vehicle at the same time, the proximity of the spacecraft in the constellation could increase demand on one or more ground stations. However, to reduce system complexity and development costs, it is desired to minimize the number and intricacy of ground facilities and ground support equipment.

SYSTEMS AND METHODS FOR MULTI-SPACECRAFT DISTRIBUTED ASCENT

FIELD

The present disclosure relates generally to a system for deploying a constellation of spacecraft, and more particularly, to a procedure to separate spacecraft deployed from a single launch vehicle from each other in such a way that during ascent maneuvers, times that each spacecraft is in view of a particular ground station has about minimal overlap with times that other spacecraft deployed from the same launch vehicle are in view of the same ground station.

BACKGROUND

For many applications, a constellation of spacecraft is required. Traditionally, deployment of spacecraft constellations, such as groups of satellites, into separate orbits requires numerous launches which can be costly. Alternatively, if many spacecraft comprising a constellation are launched from a single launch vehicle at the same time, the proximity of the spacecraft in the constellation could increase demand on one or more ground stations. However, to reduce system complexity and development costs, it is desired to minimize the number and intricacy of ground facilities and ground support equipment.

What is needed is a strategy to minimize ground station support complexity while addressing constellation initialization issues.

SUMMARY

In one example, a method of deploying a constellation of spacecraft is described. The method comprises releasing a cluster of spacecraft from a launch vehicle at a first orbit, separating spacecraft in the cluster of spacecraft from each other to minimize overlapping visibility periods from a ground station, and raising each of the spacecraft as separated simultaneously in a synchronized ascent to a respective final orbit.

In another example, a non-transitory computer readable storage medium is described having stored therein instructions, that when executed by a system having one or more processors, causes the system to perform functions. The functions comprise causing spacecraft in a cluster of spacecraft that have been released into a first orbit to separate from each other to minimize overlapping visibility periods from a ground station, and causing each of the spacecraft as separated to raise simultaneously in a synchronized ascent to a respective final orbit.

In another example, a system for deploying a constellation of spacecraft is described. The system comprises a cluster of spacecraft in orbit at a first orbit, and a ground station in communication with spacecraft of the cluster of spacecraft when the spacecraft of the cluster are visible to the ground station. The ground station sends a first command to each spacecraft in the cluster of spacecraft indicating to separate from each other so that relative phasing of each spacecraft to each other minimizes overlapping visibility periods from the ground station, and after the spacecraft have separated, the ground station sends a second command to each of the spacecraft indicating to raise as separated simultaneously in a synchronized ascent to a respective final orbit.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 17 shows a flowchart of another example method that may be used with the method of FIG. 14, according to an example embodiment.

FIG. 18 shows a flowchart of another example method that may be used with the method of FIG. 14, according to an example embodiment.

FIG. 19 shows a flowchart of another example method that may be used with the method of FIG. 14, according to an example embodiment.

FIG. 20 shows a flowchart of another example method that may be used with the method of FIG. 14, according to an example embodiment.

FIG. 21 shows a flowchart of another example method that may be used with the method of FIG. 14, according to an example embodiment.

FIG. 22 shows a flowchart of another example method that may be used with the method of FIG. 14, according to an example embodiment.

FIG. 23 shows a flowchart of another example method that may be used with the method of FIG. 14, according to an example embodiment.

FIG. 24 shows a flowchart of another example method of deploying a constellation of spacecraft, according to an example embodiment.

FIG. 25 shows a flowchart of another example method that may be used with the method of FIG. 24, according to an example embodiment.

FIG. 26 shows a flowchart of another example method that may be used with the method of FIG. 24, according to an example embodiment.

FIG. 27 shows a flowchart of another example method that may be used with the method of FIG. 24, according to an example embodiment.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples herein, a multi-spacecraft low-thrust distributed ascent strategy is described characterized by relative phasing of each spacecraft involved in an ascent cluster, and a final phasing of each spacecraft within the constellation as well as ground station constraints associated with an applied mission. Following deployment of the spacecraft cluster from a launch vehicle, a method of relative spatial separation from spacecraft to spacecraft is described to create an orbit phase between the spacecraft at some staging orbit. After phasing of the spacecraft within the staging orbit, the constellation ascends in a simultaneous fashion keeping their relative phasing.

The strategy minimizes ground support complexity and constellation initialization complexity, such as ground asset support needs. The strategy performs orbit raising in a way that schedules ground contacts in a synchronized, predictable fashion, and also phases spacecraft prior to ascent into final orbit. Some solutions perform spacecraft ascent with no regard to ground station impact, however, the examples described herein include distributed and phased ascent of spacecraft to minimize ground support needs.

Within examples, releasing and pre-separating the spacecraft cluster at a lower orbit, and then commanding all spacecraft in the cluster to move to a higher orbit simultaneously, where each satellite assumes a different final orbit from others in the constellation, achieves final phasing as desired. This also enables multiple spacecraft comprising a constellation to be launched together and efficiently operated on-orbit, thus reducing the total cost of the mission.

Figure 1:
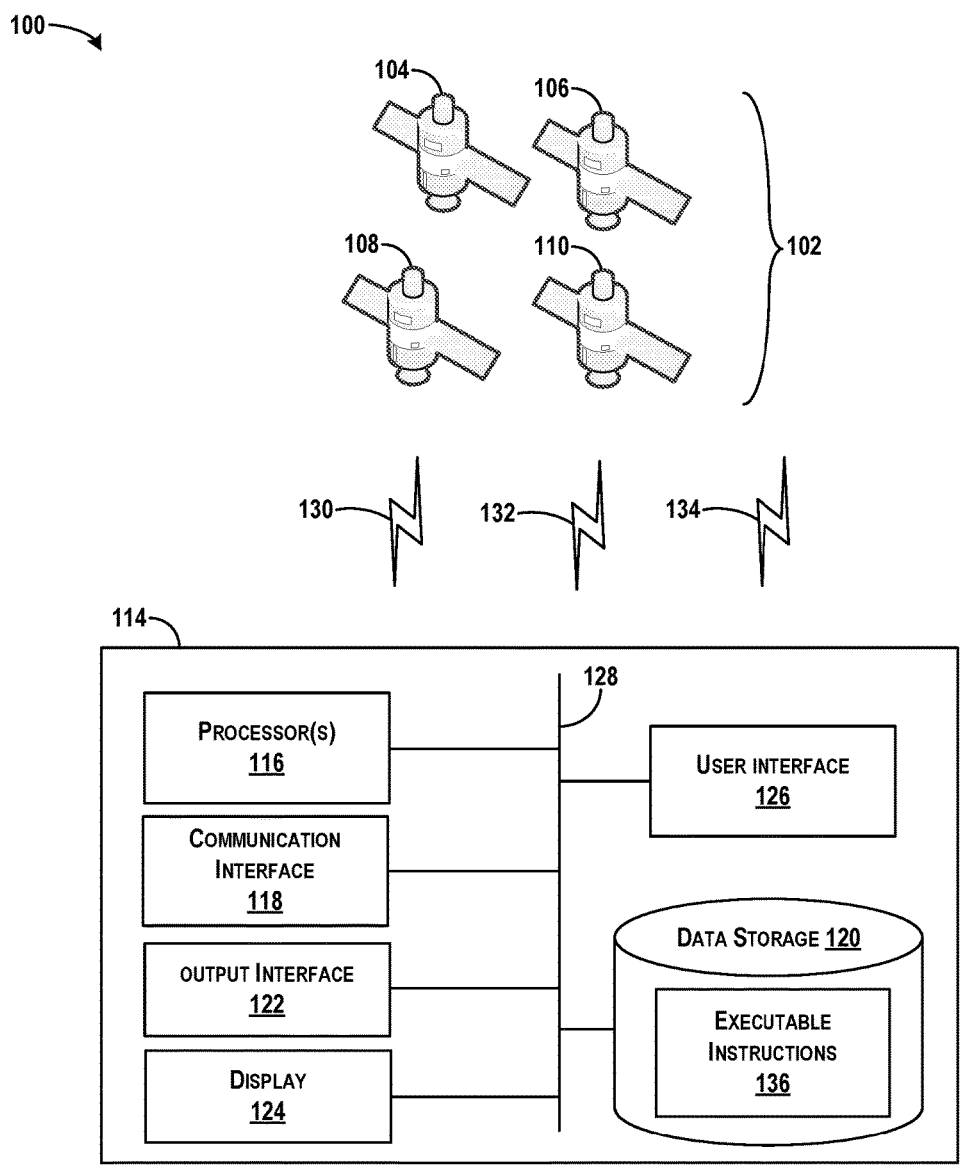
FIG. 1 illustrates a system for deploying a constellation of spacecraft is illustrated, according to an example embodiment.

Referring now to FIG. 1, a system 100 for deploying a constellation of spacecraft is illustrated, according to an example embodiment. The system 100 includes a cluster 102 of spacecraft 104, 106, 108, and 110 in orbit at a first orbit. The system 100 also includes a ground station 114 in communication with spacecraft of the cluster 102 of spacecraft when the spacecraft 104, 106, 108, and 110 are visible to the ground station 114.

The cluster 102 of spacecraft is shown to include four spacecraft. However, in other examples, the cluster 102 may include more or fewer spacecraft, or may include between two to about twelve or sixteen spacecraft, for example. The spacecraft 104, 106, 108, and 110 are shown to be satellites. However, in other examples, the spacecraft 104, 106, 108, and 110 may include other vehicles for orbit per specific missions, and the spacecraft 104, 106, 108, and 110 can include different combinations of spacecraft as well depending on a specific mission.

The spacecraft 104, 106, 108, and 110 may be configured to revolve around the Earth (or other celestial body) in respective orbits. In some examples, the orbits of the spacecraft 104, 106, 108, and 110 may have some inclination angle relative to an orbital plane in which the target orbit lies.

The ground station 114 includes one or more processor(s) 116, a communication interface 118, data storage 120, an output interface 122, a display 124, and a user interface 126 each connected to a communication bus 128. The ground station user interface 126 may also include hardware to enable communication within the ground station 114 and between the ground station 114 and other devices (not shown). The hardware may include transmitters, receivers, and antennas, for example.

The communication interface 118 may be a wireless interface and/or one or more wireline interfaces that allow for both short-range communication and long-range communication to one or more networks or to one or more remote devices. Such wireless interfaces may provide for communication under one or more wireless communication protocols, such as Bluetooth, WiFi (e.g., an Institute of Electrical and Electronic Engineers (IEEE) 802.11 protocol), Long-Term Evolution (LTE), cellular communications, satellite communications, and/or other wireless communication protocols. Such wireline interfaces may include Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 118 may be configured to receive input data from one or more devices, and may also be configured to send output data to other devices.

As an example, the communication interface 118 enables the ground station 114 to wirelessly communicate with the spacecraft 104, 106, 108, and 110 of the cluster 102 through wireless communication links, such as wireless communication links 130, 132, and 134.

The data storage 120 may include or take the form of one or more computer-readable storage media that can be read or accessed by the processor(s) 116. The computer-readable storage media can include volatile and/or non-volatile storage components, such as optical, magnetic, organic or other memory or disc storage, which can be integrated in whole or in part with the processor(s) 116. The data storage 120 is considered non-transitory computer readable media. In some embodiments, the data storage 120 can be implemented using a single physical device (e.g., one optical, magnetic, organic or other memory or disc storage unit), while in other embodiments, the data storage 120 can be implemented using two or more physical devices.

The data storage 120 thus is a non-transitory computer readable storage medium, and executable instructions 136 are stored thereon. The executable instructions 136 include computer executable code. When the executable instructions 136 are executed by the processor(s) 116, the processor(s) 116 are caused to perform functions. Such functions are described below.

The processor(s) 116 may be a general-purpose processor or a special purpose processor (e.g., digital signal processors, application specific integrated circuits, etc.). The processor(s) 116 may receive inputs from the communication interface 118, and process the inputs to generate outputs that are stored in the data storage 120 and output to the display 124. The processor(s) 116 can be configured to execute the executable instructions 136 (e.g., computer-readable program instructions) that are stored in the data storage 120 and are executable to provide the functionality of the ground station 114 described herein.

The output interface 122 outputs information to the display 124 or to other components as well. Thus, the output interface 122 may be similar to the communication interface 118 and can be a wireless interface (e.g., transmitter) or a wired interface as well.

The ground station 114 may be or include a computing device of various forms, and can be included within a number of different computing devices or servers, for example. In addition, components of the ground station 114 can be separate from ground station 114 in some examples, such as the display 124 being a separate component.

Within examples, the processor(s) 116 of the ground station 114 can execute the executable instructions 136 stored in the data storage 120 to perform functions of sending a first command to each spacecraft 104, 106, 108, and 110 in the cluster 102 indicating to separate from each other so to minimize overlapping visibility periods from the ground station (e.g., relative phasing of each spacecraft 104, 106, 108, and 110 to each other can be about even from a perspective of the ground station 114). Within examples, the ground station 114 sends the first command instructing the spacecraft 104, 106, 108, and 110 in the cluster 102 to increase or decrease in altitude in a sequential manner, and as a respective spacecraft changes altitude, the respective spacecraft travels in a second orbit incurring a drift resulting in the relative phasing with respect to other spacecraft in the cluster 102. In addition, Following, the processor(s) 116 of the ground station 114 can execute the executable instructions 136 stored in the data storage 120 to perform functions of sending a second command to each of the spacecraft 104, 106, 108, and 110 indicating to raise as separated simultaneously in a synchronized ascent to a respective final orbit. For example, the ground station 114 sends the second command instructing each of the spacecraft 104, 106, 108, and 110 to maneuver to the respective final orbit and indicating when to begin the maneuver in order to achieve the synchronized ascent and to maintain the relative phasing of each spacecraft to each other.

Figure 2:
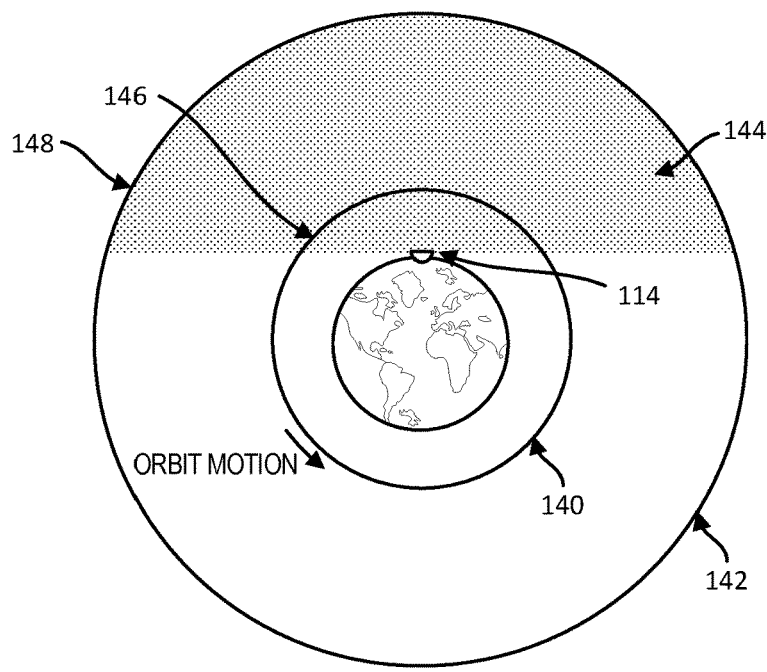
FIG. 2 is a diagram illustrating a conceptual orbit motion of the spacecraft and a visibility arc (portion of the orbit) for the ground station, according to an example embodiment.

FIG. 2 is a diagram illustrating a conceptual orbit motion of the spacecraft 104, 106, 108, and 110 and a visibility arc 144 for the ground station 114, according to an example embodiment. The spacecraft 104, 106, 108, and 110 will be injected into orbit at a first orbit 140 of the Earth, and following separation and ascent, the spacecraft 104, 106, 108, and 110 will arrive at a final orbit 142 of the Earth.

The ground station 114 is located on a surface of the Earth, and can only communicate with spacecraft in orbit when the spacecraft are within the visibility arc 144. The visibility arc 144 corresponds to a line of sight from the ground station 114 to the spacecraft being above the horizon at ground station 114. Thus, the ground station 114 will only be able to communicate with spacecraft during a portion of the orbit, and a higher orbit provides a greater amount of time in which the ground station 114 may communicate with the spacecraft. The visibility arc 144 is shown are being between visibility arcs 146 and 148, which are parts of the first and final orbits, respectively.

Figure 3:
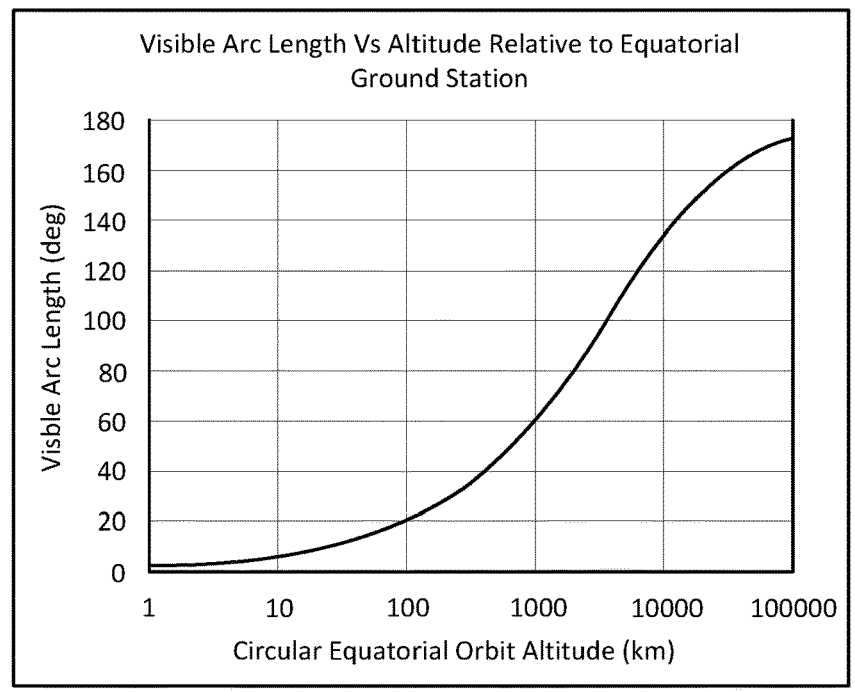
FIG. 3 illustrates a graph showing an example visible arc length versus altitude relative to Equatorial Ground Station, according to an example embodiment.

FIG. 3 illustrates a graph showing an example visible arc length versus altitude relative to Equatorial Ground Station, according to an example embodiment. As shown, as the circular equatorial orbit altitude increases, the visible arc length increases as well. Thus, as mentioned, a higher orbit provides a greater amount of time in which the ground station 114 may communicate with the spacecraft.

The ground station 114 may only be able to communicate with one spacecraft at a time. Communications between the ground station 114 and spacecraft include both uplink and downlink communications so as to receive telemetry information (e.g., information indicating data collected by the spacecraft), and to preform ranging (e.g., distance measurements to measure orbit), as well as to send commands to the spacecraft (e.g., instruct to operate heaters, turn on functions and processes, send instructions for executing maneuvers, etc.). Since the ground station 114 communicates with the spacecraft over a direct line-of-sight wireless communication link, if the cluster 102 of spacecraft are all within the visibility arc 144 at the same time, the ground station 114 may not be able to communicate with each during the period of orbit in which the cluster 102 is in the visibility arc 144 because the ground station 114 only communicates with one spacecraft at a time.

Figure 4:
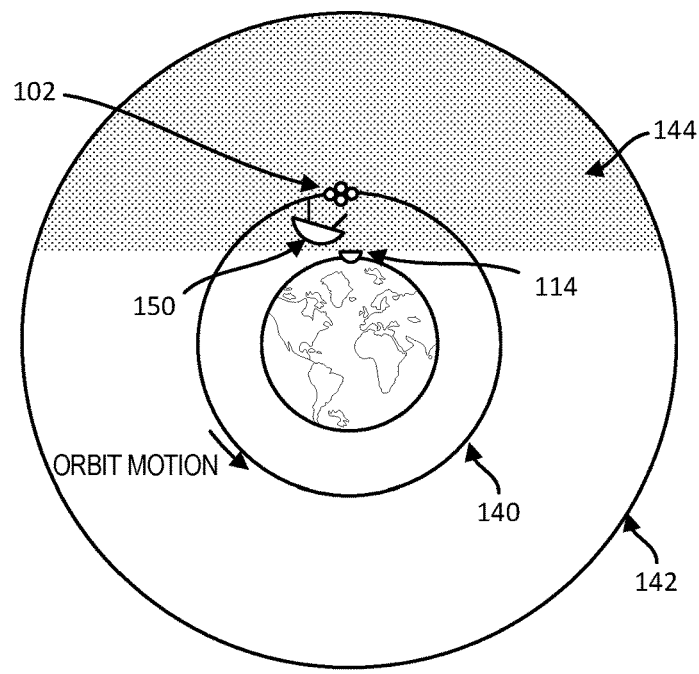
FIG. 4 is a diagram illustrating a conceptual deployment of the cluster of spacecraft, according to an example embodiment.

FIG. 4 is a diagram illustrating a conceptual deployment of the cluster 102 of spacecraft, according to an example embodiment. In this example, the four spacecraft 104, 106, 108, and 110 are represented. The cluster 102 are released from a launch vehicle 150 at the first orbit 140. A single launch vehicle 150 is used, and the launch vehicle 150 may take many forms include a spacecraft or rocket ship, for example.

The cluster 102 is deployed at a first orbit (e.g., which may be circular), and the cluster 102 moves in unison around the Earth along the first orbit 140. A relative phasing or spacing of each spacecraft to each other is about 0° when seen from the ground since all spacecraft are in the same general first orbit 140 (within a distance tolerance to one another so as to avoid collisions). The spacecraft may not be in the same exact orbit, but will be very close to within the same orbit so as to travel in orbital motion into and out of view of the ground station 114 at the substantially same time.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 5:
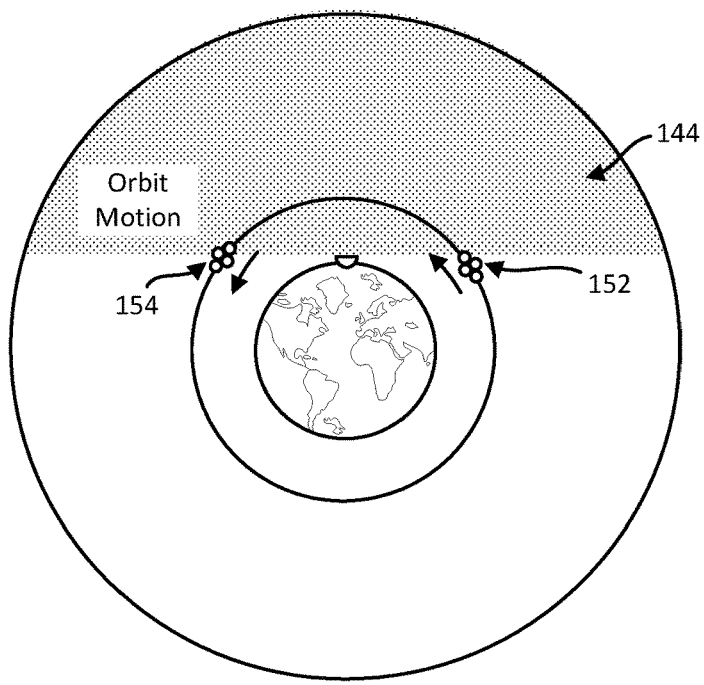
FIG. 5 is a diagram illustrating a conceptual orbital motion of the cluster of spacecraft, according to an example embodiment.

FIG. 5 is a diagram illustrating a conceptual orbital motion of the cluster 102 of spacecraft, according to an example embodiment. Since all spacecraft are in the cluster 102 together, all spacecraft are simultaneously in view of the ground station 114 at the same time when within the visibility arc 144. For example, all spacecraft will come into view of the ground station 114 (as shown by arrow 152 with the cluster entering the visibility arc 144) at approximately the same time, and then go out of view of the ground station 114 (as shown by arrow 154 with the cluster leaving the visibility arc 144) after a period of time. The time period may not be long enough to allow each spacecraft to have enough communication time with the ground station 114.

Alternatively, efficiency can be achieved by using one ground station when spacing between the spacecraft of the cluster 102 is configured in a manner so that the spacecraft come in view of the ground station 114 at different times so the ground station 114 can communicate with each spacecraft individually for a longer period of time. Thus, the spacecraft can be separated from each other so that relative phasing of each spacecraft to each other is about even from a perspective of the ground station 114, to minimize overlapping visibility periods from the ground station 114, for example. The separating, or phasing, of the spacecraft can allow the ground station 114 to communicate with each individually since each can be spaced apart so that about at most one is within the visibility arc 144 at any given time, for example. Or, the spacecraft can be separated so that a respective spacecraft is in the visibility arc 144 long enough for communication to occur with the ground station 114. Within examples described below, the spacecraft in the cluster 102 are separated by increasing or decreasing in altitude in a sequential manner, so that as a respective spacecraft changes altitude, the respective spacecraft travels in a second orbit incurring a drift resulting in the relative phasing with respect to other spacecraft in the cluster 102.

Figure 6:
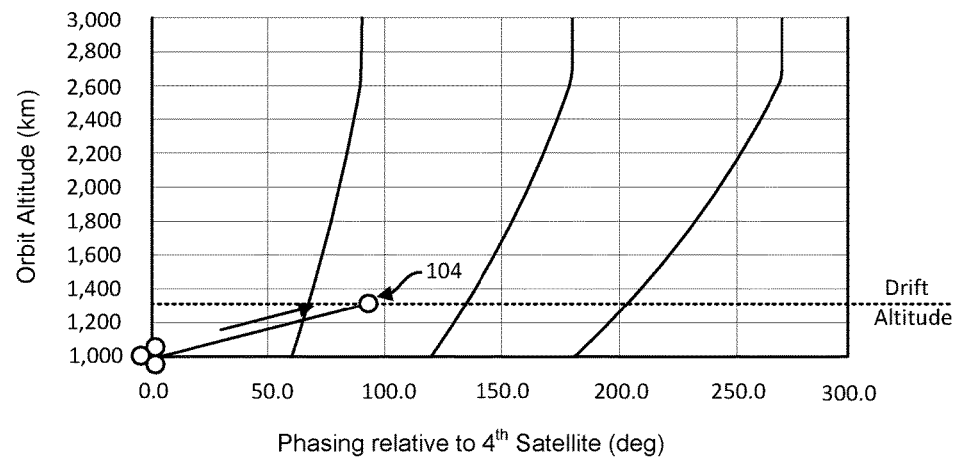
FIG. 6 is a diagram illustrating another conceptual orbital motion of the cluster of spacecraft, according to an example embodiment.
Figure 6:
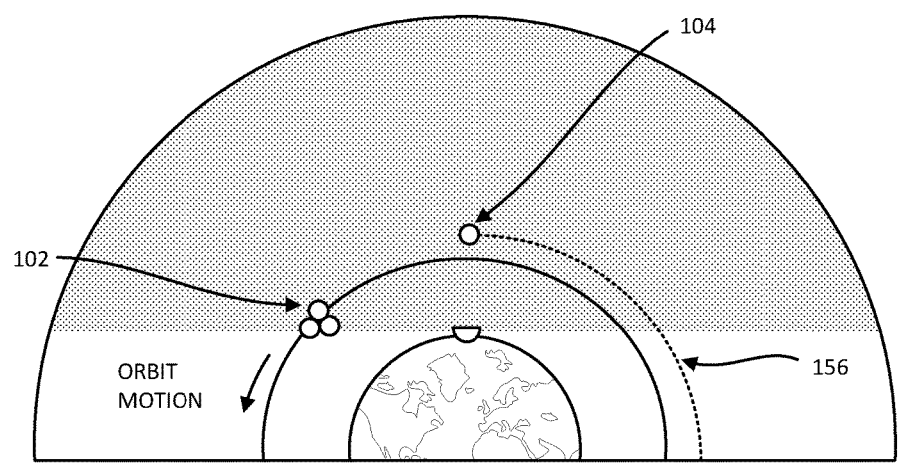

FIG. 6 is a diagram illustrating another conceptual orbital motion of the cluster 102 of spacecraft, according to an example embodiment. In FIG. 6, a spacecraft in the cluster 102 begins a maneuver to increase or decrease the orbit size (altitude), and therefore induce a drift rate with respect to the spacecraft remaining in the cluster 102. Over time, the drift incurs a phasing or separation relative to the spacecraft remaining in the cluster 102. The spacecraft 104 stops the burn maneuver when the desired drift rate from the cluster 102 is obtained. In this example, a desired drift rate may result in about a phase separation angle of 90°. A resulting drift orbit 156 of the spacecraft 104 causes the spacecraft 104 to be separated from the cluster 102.

FIG. 6 also illustrates a table showing the spacecraft 104 separated by the cluster 102 by about 90°. This phase separation can be achieved, for example, as shown at about the drift orbit 156 of 1,300 km. By increasing to a higher drift altitude, the spacecraft 104 drifts due to a larger orbit around the Earth.

Figure 7:
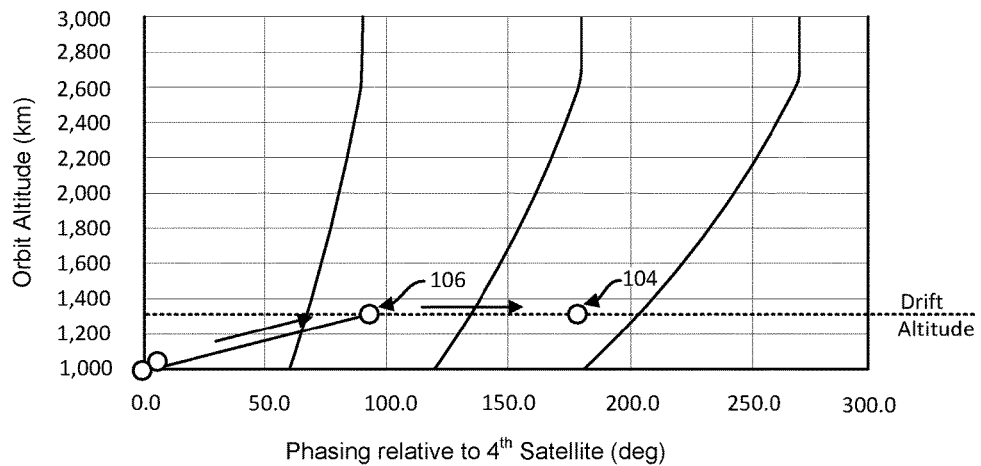
FIG. 7 is a diagram illustrating another conceptual orbital motion of the cluster of spacecraft, according to an example embodiment.
Figure 7:
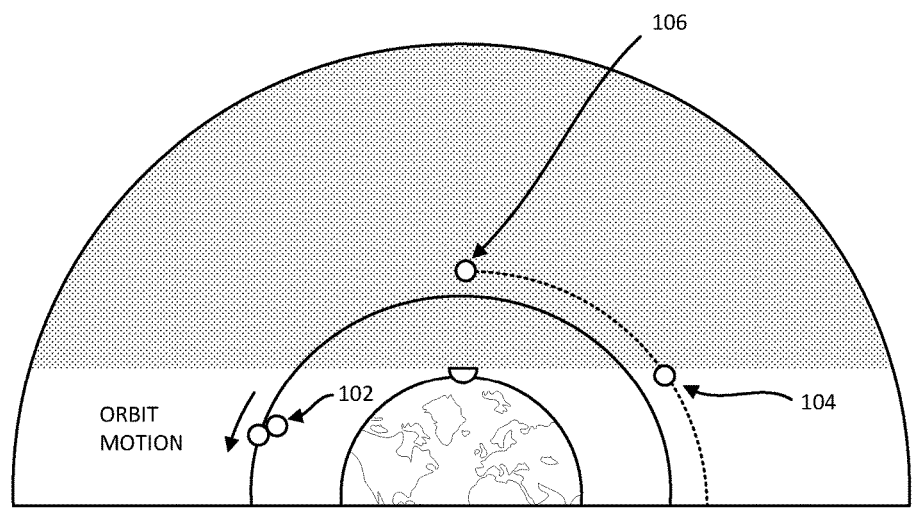

FIG. 7 is a diagram illustrating another conceptual orbital motion of the cluster 102 of spacecraft, according to an example embodiment. In FIG. 7, the spacecraft 104 coasts as the next spacecraft 106 begins a maneuver to increase or decrease the orbit size (altitude), and therefore induce a drift rate with respect to the spacecraft remaining in the cluster 102. Over time, the drift incurs a phasing or separation relative to the spacecraft remaining in the cluster 102. The spacecraft 106 stops the burn maneuver when the desired drift from cluster 102 is obtained. Spacecraft 106 will remain separated from spacecraft 104. An amount of separation will be controlled by an amount of time elapsed between a start of maneuvering of spacecraft 104 and a start of maneuvering of spacecraft 106.

FIG. 7 also illustrates a table showing the spacecraft 106 separated by the spacecraft 104 by about 90°. This phase separation can be achieved, for example, as shown at about the drift altitude of 1,300 km. By increasing to a higher drift altitude, the spacecraft 106 drifts due to a larger orbit around the Earth and may now be in the same orbit as the spacecraft 104.

Figure 8:
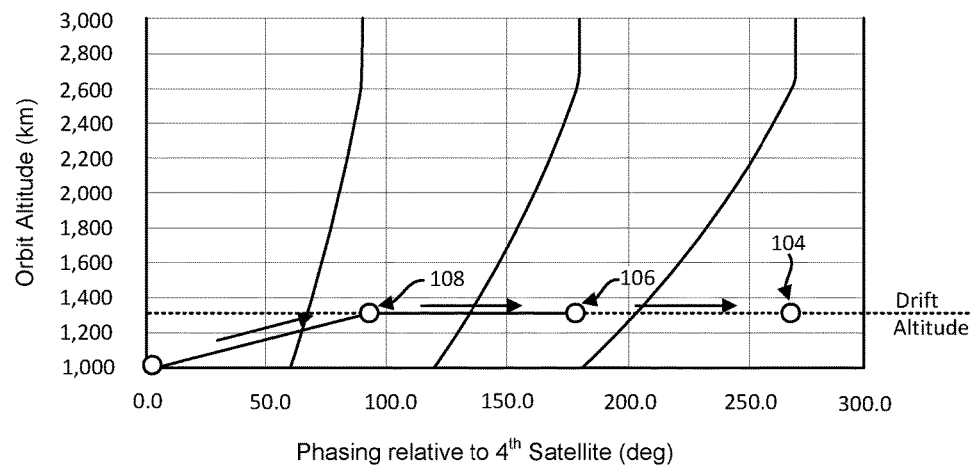
FIG. 8 is a diagram illustrating another conceptual orbital motion of the cluster of spacecraft, according to an example embodiment.
Figure 8:
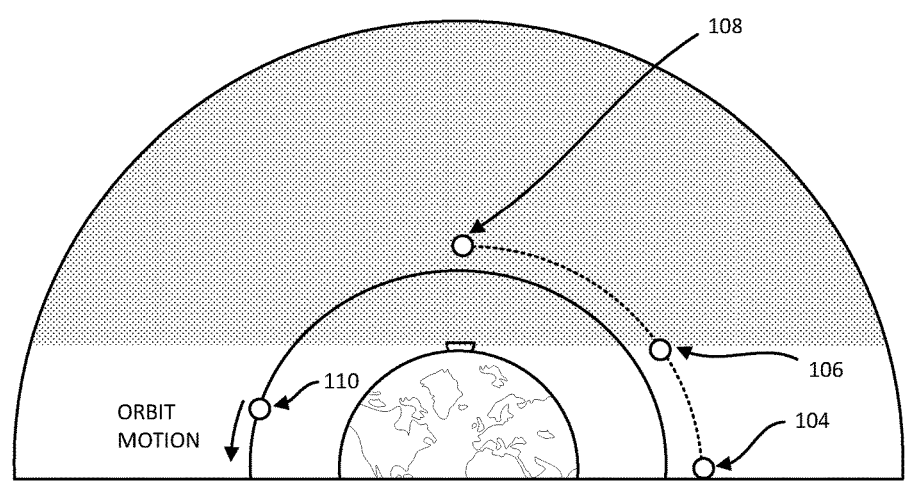

FIG. 8 is a diagram illustrating another conceptual orbital motion of the cluster 102 of spacecraft, according to an example embodiment. In FIG. 8, the spacecraft 104 and 106 coast as the next spacecraft 108 begins a maneuver to increase or decrease the orbit size (altitude), and therefore induce a drift rate with respect to the spacecraft remaining in the cluster 102. The spacecraft 108 stops the burn maneuver when the desired drift from cluster 102 is obtained. Spacecraft 108 will remain separated from spacecraft 106 and spacecraft 104. An amount of separation will be controlled by an amount of time elapsed between a start of maneuvering of spacecraft 108 and a start of maneuvering of spacecraft 106.

FIG. 8 also illustrates a table showing the spacecraft 108 separated by about 90°. This phase separation can be achieved, for example, as shown at about the drift altitude of 1,300 km. By increasing to a higher drift altitude, the spacecraft 108 drifts due to a larger orbit around the Earth and may now be in the same orbit as the spacecraft 104 and the spacecraft 106.

Figure 9:
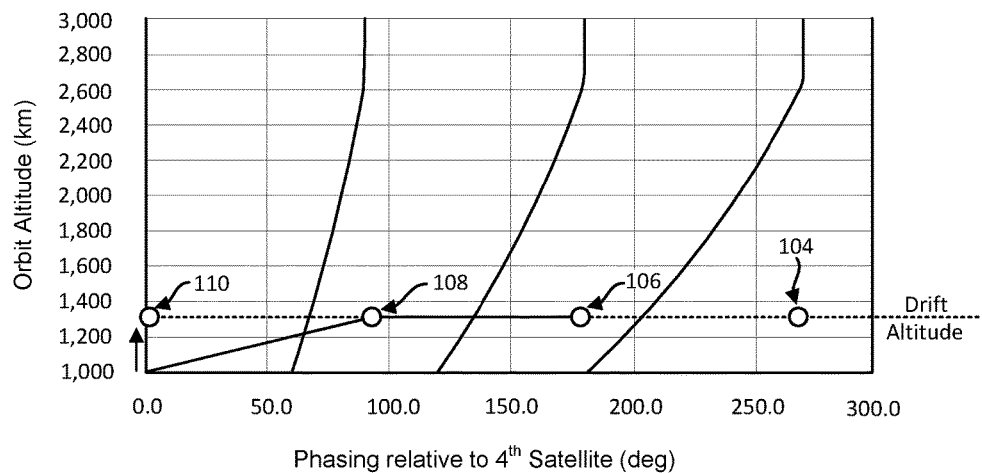
FIG. 9 is a diagram illustrating another conceptual orbital motion of the cluster of spacecraft, according to an example embodiment.
Figure 9:
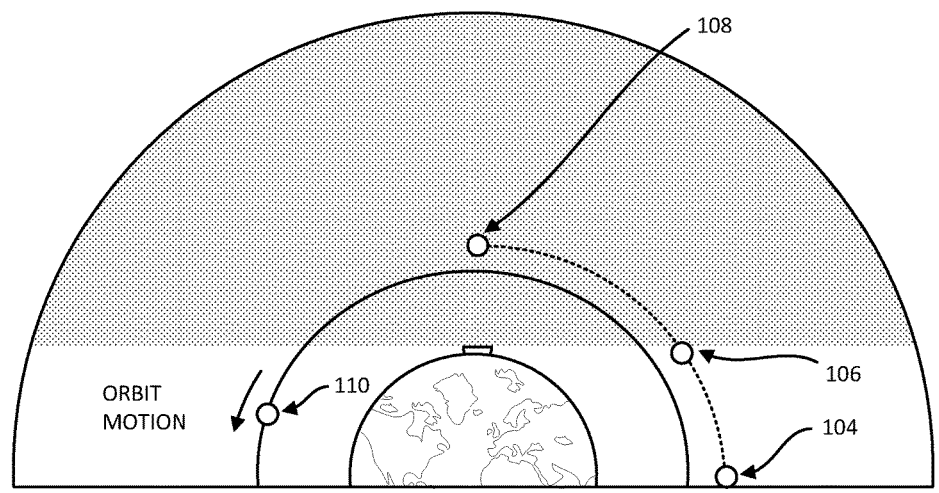

FIG. 9 is a diagram illustrating another conceptual orbital motion of the cluster 102 of spacecraft, according to an example embodiment. In FIG. 9, the spacecraft 104, 106, and 108 coast as the next spacecraft 110 begins a maneuver to increase or decrease the orbit size (altitude), and therefore reduce the drift rate difference with respect to, spacecraft 104, 106, and 108. Spacecraft 110 will remain separated from spacecraft 108, spacecraft 106 and spacecraft 104. An amount of separation will be controlled by an amount of time elapsed between a start of maneuvering of spacecraft 110 and a start of maneuvering of spacecraft 108.

FIG. 9 also illustrates a table showing all the spacecraft 104, 106, 108, and 110 separated by about 90°. This phase separation can be achieved, for example, as shown at about the drift altitude of 1,300 km.

The specific amount of phase separation may be based on how many spacecraft are included in the cluster 102 so that after all spacecraft are separated, only one spacecraft is visible to the ground station 114 at any given time. In one example, the separation phase is about 360/x, where x is a number of spacecraft in the cluster 102. Thus, spacing can be even around the Earth within some tolerance to distribute load on the ground station 114 so that the ground station 114 can do more for each spacecraft (and minimize idle times of ground station 114, for example).

As one example, with sixteen spacecraft, spacing is 360/16 enabling 1/16 orbit time for the ground station 114 to work with each individual spacecraft and communicate with each individual spacecraft when the spacecraft is visible (e.g., to allow enough time for antenna pointing, configuration, ranging, communications and data processing to occur as needed for the ground station 114, and after that do the same for the next spacecraft, and so on). Example communications that the ground station 114 performs includes assessing health of the spacecraft, as well as providing commands for operations that the spacecraft is to perform.

Following separation, each of the spacecraft 104, 106, 108, and 110 is raised, as separated, simultaneously in a synchronized ascent to their respective final orbits. Thus, the separation can be achieved by raising all the spacecraft by a small amount (e.g., 1000 km to 1400 km) sequentially to provide phasing (separation) at a lower orbit, and then a timed simultaneous ascent of all spacecraft 104, 106, 108, and 110 results in the spacecraft 104, 106, 108, and 110 arriving at their final orbits retaining the desired separation. The final orbit may be much higher, such as between about 2,400 km to 45,000 km or higher.

Figure 10:
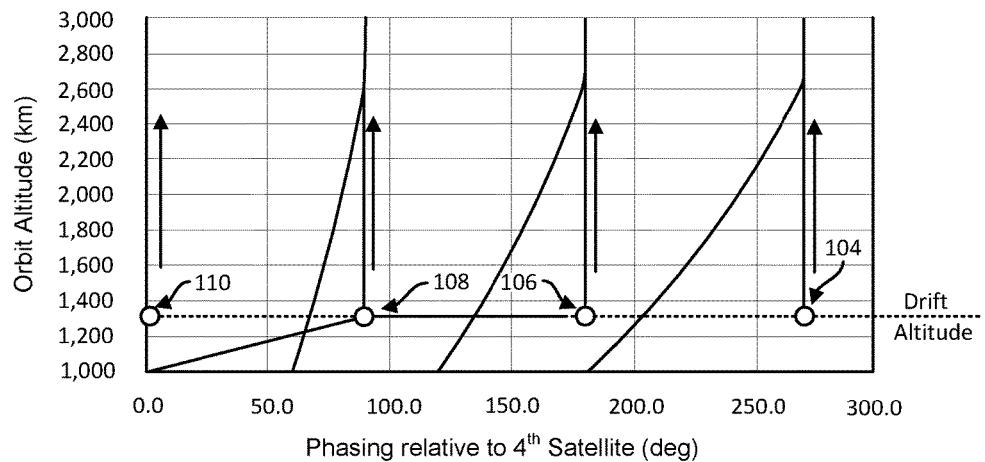
FIG. 10 illustrates a table showing all the spacecraft being raised to a higher altitude, according to an example embodiment.

FIG. 10 illustrates a table showing all the spacecraft 104, 106, 108, and 110 being raised to a higher altitude, according to an example embodiment. For example, as the last spacecraft 110 approaches the drift altitude, all the spacecraft 104, 106, 108, and 110 begin their pre-loaded burn to simultaneously maneuver from about the same starting drift orbit 156 with 90° phase separation from each other. The ground station 114 may send a timed command to each of the spacecraft 104, 106, 108, and 110, when visible to the ground station 114, indicating when to maneuver to the respective final orbit. The ground station 114 individually commands the spacecraft 104, 106, 108, and 110 to separate and then raise in altitude. The timed command indicates when to begin the maneuver (e.g., a start time) in order to achieve the synchronized ascent and to maintain the relative phasing of each spacecraft to each other.

The simultaneous raising of each of the spacecraft 104, 106, 108, and 110 occurs starting from about a same starting altitude (e.g., the drift orbit 156), which is higher or lower than the first orbit 140, with the relative phasing separating each of the spacecraft to each other resulting in the relative phasing remaining in place once each of the spacecraft arrives at the respective final orbit 142.

The final orbit 142 may be the same for all spacecraft 104, 106, 108, and 110, or each spacecraft may have a separate final orbit depending on an applicable mission.

Figure 11:
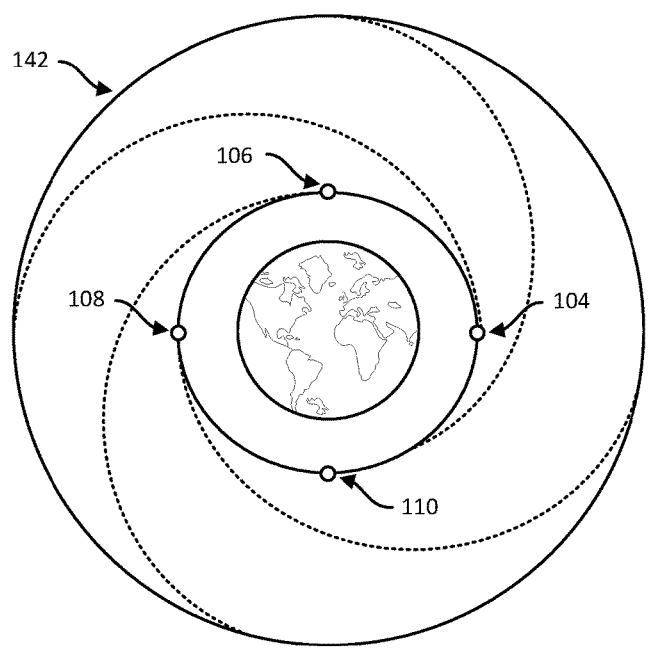
FIG. 11 is a diagram illustrating a conceptual orbital motion of the spacecraft, according to an example embodiment.

FIG. 11 is a diagram illustrating a conceptual orbital motion of the spacecraft 104, 106, 108, and 110, according to an example embodiment. A simultaneous burn of all the spacecraft 104, 106, 108, and 110 results in a synchronized ascent with all the spacecraft 104, 106, 108, and 110 separated in phase (e.g., 90°). This results in a desired phasing or separation at the final orbit 142. In addition, this creates spacing between the spacecraft 104, 106, 108, and 110 from a perspective of the ground station 114 to enable a manageable and predictable visibility time frame at the ground station 114 as the constellation of spacecraft ascends to the final orbit 142.

Figure 12:
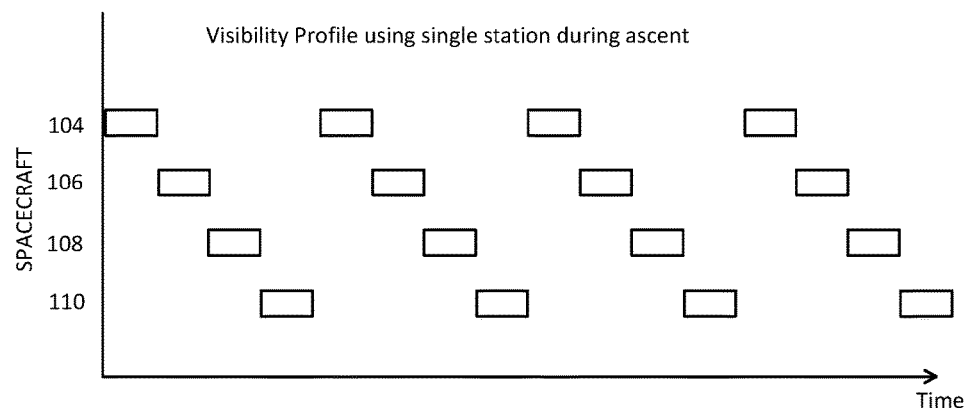
FIG. 12 is a diagram illustrating a conceptual visibility profile of the spacecraft from the ground station, according to an example embodiment.

FIG. 12 is a diagram illustrating a conceptual visibility profile of the spacecraft 104, 106, 108, and 110 from the ground station 114, according to an example embodiment. As shown in FIG. 12, over time, each spacecraft comes into and out of view of the ground station 114 in a pattern due to the orbital motion and spacing between the spacecraft 104, 106, 108, and 110.

Figure 13:
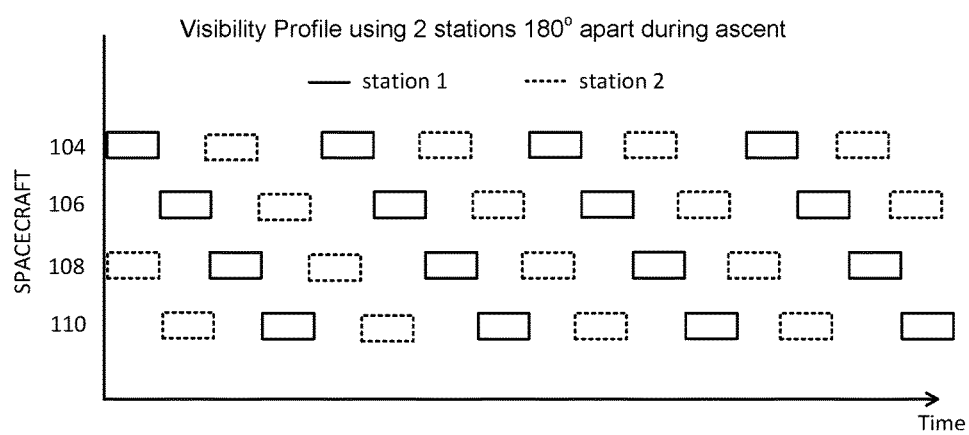
FIG. 13 is a diagram illustrating another conceptual visibility profile of the spacecraft in an instance using two ground stations 180° apart, according to an example embodiment.

FIG. 13 is a diagram illustrating another conceptual visibility profile of the spacecraft 104, 106, 108, and 110 in an instance using two ground stations 180° apart in longitude, according to an example embodiment. As shown in FIG. 13, the solid line rectangles represent spacecraft in view of a first ground station and the dotted line rectangles represent spacecraft in view of the second ground station. Again, over time, each spacecraft comes into and out of view of the ground stations in a pattern due to the orbital motion and spacing between the spacecraft 104, 106, 108, and 110.

Figure 14:
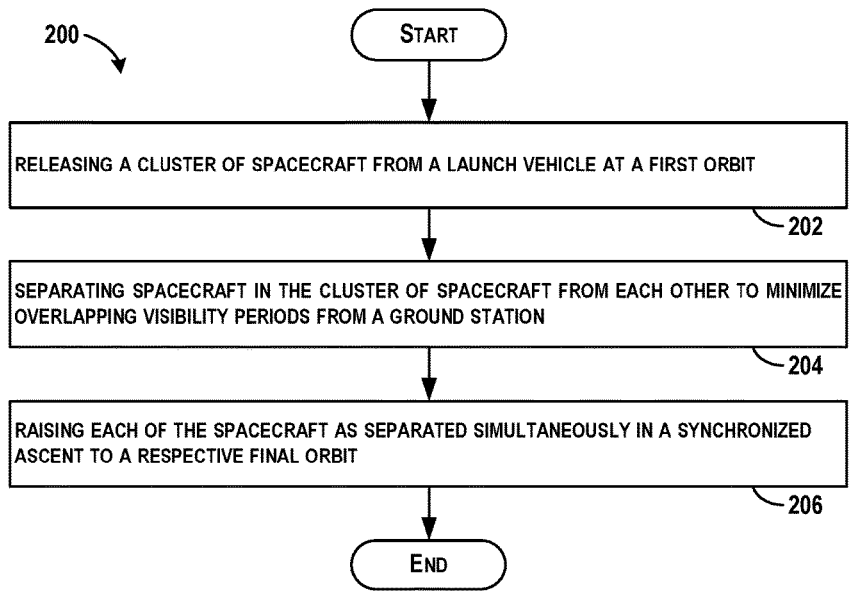
FIG. 14 shows a flowchart of an example method of deploying a constellation of spacecraft, according to an example embodiment.

FIG. 14 shows a flowchart of an example method of deploying a constellation of spacecraft, according to an example embodiment. Method 200 shown in FIG. 14 presents an embodiment of a method that could be used with the system 100 shown in FIG. 1, for example, or the ground station 114. Further, devices or systems may be used or configured to perform logical functions presented in FIG. 14. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 14, and within other processes and methods disclosed herein, may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes releasing the cluster 102 of spacecraft from the launch vehicle 150 at the first orbit 140. Within examples, after releasing the cluster 102 of spacecraft from the launch vehicle 150 at the first orbit 140, relative phasing of each spacecraft to each other is about zero degrees At block 204, the method 200 includes separating spacecraft in the cluster 102 of spacecraft from each other to minimize overlapping visibility periods from the ground station 114. This can include, for example, separating the spacecraft in the cluster 102 so that relative phasing of each spacecraft to each other is about even from a perspective of the ground station 114. The separation occurs in a sequential manner, and as a respective spacecraft changes altitude, the respective spacecraft travels in a second orbit incurring a drift resulting in the relative phasing with respect to other spacecraft in the cluster 102, for example. In addition, in some examples, the separation occurs such that only one spacecraft is visible to the ground station 114 at any given time to reduce cost by having and using only one ground station at a time.

At block 206, the method 200 includes raising each of the spacecraft as separated simultaneously in a synchronized ascent to a respective final orbit 142. The ground station 114 can send a timed command to each of the spacecraft, when visible to the ground station 114, indicating to maneuver to the respective final orbit 142. The timed command may indicate a start time for the simultaneous ascent. Thus, each of the spacecraft 104, 106, 108, and 110 can be simultaneously raised from about a same starting altitude (e.g., the drift orbit 156), higher or lower than the first orbit 140, with the relative phasing separating each of the spacecraft to each other resulting in the relative phasing remaining once each of the spacecraft arrives at the respective final orbit 142.

The ground station 114 is positioned on a surface of Earth and communicates with each spacecraft via a line-of-sight communication and communicates with each spacecraft one at a time. Thus, the ground station 114 individually commands the spacecraft 104, 106, 108, and 110 to separate and then raise. This method avoids the need for many ground stations to reduce cost of the system 100.

The method 200 may take a month, 6 months, a year, etc. to complete the full separation and ascent of the spacecraft to the final orbit 142 depending on an altitude of the first orbit 140, and altitude of the final orbit 142, a mass of the spacecraft and other factors to consider.

Figure 15:
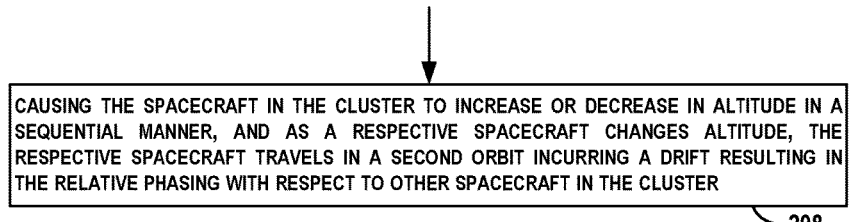
FIG. 15 shows a flowchart of an example method that may be used with the method of FIG. 14, according to an example embodiment.

FIG. 15 shows a flowchart of an example method that may be used with the method 200 of FIG. 14, according to an example embodiment. As shown at block 208, additional functions can include causing the spacecraft in the cluster 102 to increase or decrease in altitude in a sequential manner, and as a respective spacecraft changes altitude, the respective spacecraft travels in a second orbit 156 incurring a drift resulting in the relative phasing with respect to other spacecraft in the cluster 102.

Figure 16:
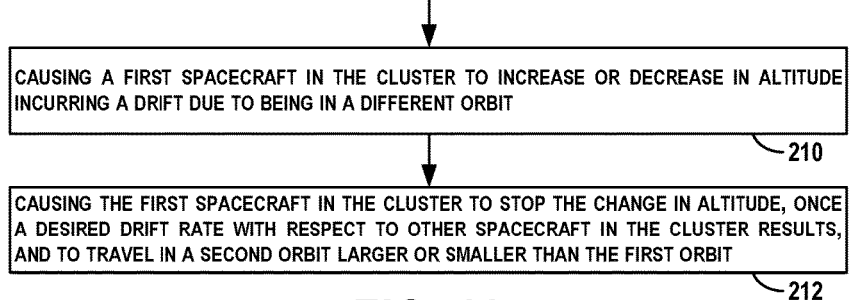
FIG. 16 shows a flowchart of another example method that may be used with the method of FIG. 14, according to an example embodiment.

FIG. 16 shows a flowchart of another example method that may be used with the method 200 of FIG. 14, according to an example embodiment. As shown at block 210, additional functions can include causing a first spacecraft in the cluster 102 to increase or decrease in altitude incurring a drift due to being in a different orbit, and as shown at block 212, further additional functions can include causing the first spacecraft in the cluster 102 to stop the change in altitude, once a desired drift rate with respect to other spacecraft in the cluster 102 results, and to travel in a second orbit larger or smaller than the first orbit 140.

FIG. 17 shows a flowchart of another example method that may be used with the method 200 of FIG. 14, according to an example embodiment. As shown at block 214, additional functions can include separating the spacecraft such that only one spacecraft is visible to the ground station at any given time.

FIG. 18 shows a flowchart of another example method that may be used with the method 200 of FIG. 14, according to an example embodiment. As shown at block 216, additional functions can include separating the spacecraft in the cluster 102 relative to each other to cause a separation phase from spacecraft to spacecraft.

FIG. 19 shows a flowchart of another example method that may be used with the method 200 of FIG. 14, according to an example embodiment. As shown at block 218, additional functions can include sending a timed command to each of the spacecraft, when visible to the ground station 114, indicating to maneuver to the respective final orbit 142, and the timed command indicates when to begin the maneuver in order to achieve the synchronized ascent and to maintain the relative phasing of each spacecraft to each other.

FIG. 20 shows a flowchart of another example method that may be used with the method 200 of FIG. 14, according to an example embodiment. As shown at block 220, additional functions can include sending each spacecraft a start time for the synchronized ascent.

FIG. 21 shows a flowchart of another example method that may be used with the method 200 of FIG. 14, according to an example embodiment. As shown at block 222, additional functions can include simultaneously raising each of the spacecraft from about a same starting orbit, different than the first orbit 140, with the relative phasing separating each of the spacecraft to each other resulting in the relative phasing remaining once each of the spacecraft arrives at the respective final orbit 142.

FIG. 22 shows a flowchart of another example method that may be used with the method 200 of FIG. 14, according to an example embodiment. As shown at block 224, additional functions can include communicating with each spacecraft via a line-of-sight communication, and as shown at block 226, further additional functions can include communicating with each spacecraft one at a time.

FIG. 23 shows a flowchart of another example method that may be used with the method 200 of FIG. 14, according to an example embodiment. As shown at block 228, additional functions can include the ground station 114 individually commanding the spacecraft to separate and then raise.

FIG. 24 shows a flowchart of another example method of deploying a constellation of spacecraft, according to an example embodiment. Method 229 shown in FIG. 24 presents an embodiment of a method that could be used with the ground station 114 to control operation of the spacecraft 104, 106, 108, and 110. Referring back to FIG. 1, the data storage 120 (or non-transitory computer readable storage medium) has stored therein the executable instructions 136, that when executed by the processor(s) 116, causes the ground station 114 to perform functions. Such functions include, as shown at block 230, causing spacecraft in the cluster 102 that have been released into a first orbit 140 to separate from each other to minimize overlapping visibility periods from a ground station 114, and as shown at block 232, causing each of the spacecraft as separated to raise simultaneously in a synchronized ascent to a respective final orbit 142.

FIG. 25 shows a flowchart of another example method that may be used with the method 229 of FIG. 24, according to an example embodiment. As shown at block 234, additional functions can include causing a release of the cluster of spacecraft from the launch vehicle 150 at the first orbit 140 by sending a command to the launch vehicle to release the cluster of spacecraft.

FIG. 26 shows a flowchart of another example method that may be used with the method 229 of FIG. 24, according to an example embodiment. As shown at block 236, additional functions can include sending a command to each of the spacecraft in the cluster 102 to change in altitude in a sequential manner, and as a respective spacecraft changes altitude, the respective spacecraft travels in a second orbit 156 incurring a drift resulting in the relative phasing with respect to other spacecraft in the cluster 102.

FIG. 27 shows a flowchart of another example method that may be used with the method 229 of FIG. 24, according to an example embodiment. As shown at block 238, additional functions can include sending a command to each spacecraft indicating a start time for the synchronized ascent.

Thus, the ground station 114 can perform these functions by sending commands to each of the spacecraft in the cluster 102 to increase or decrease in altitude in a sequential manner, and sending commands to each spacecraft indicating a start time for the synchronized ascent, for example. The commands can be sent wirelessly through satellite links or through direct wireless communication, for example.

The ground station 114 can send commands at appropriate times to the spacecraft, when the spacecraft are visible to the ground station 114. For example, once a first spacecraft is separated from the cluster 102 a desired amount of distance, the ground station 114 sends a command to a second spacecraft to initiate spacing separation, and so on. The ground station 114 further provides commands to all spacecraft indicating when to begin the synchronized ascent. The synchronized ascent command can be sent to each spacecraft when the spacecraft is in view of the ground station 114, and provided via a timer for a future ascent initiation such that the ascent will begin once all spacecraft have been commanded and are offset by the desired distances. The ascent command is provided ahead of time since not all spacecraft will be in view of the ground station 114 to receive the command.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method (200) of deploying a constellation of spacecraft, the method comprising:
   releasing (202) a cluster (102) of spacecraft (104, 106, 108, 110) from a launch vehicle (150) at a first orbit (140);
   separating (204) spacecraft in the cluster of spacecraft from each other to minimize overlapping visibility periods from a ground station (114); and
   raising (206) each of the spacecraft as separated simultaneously in a synchronized ascent to a respective final orbit (142).

2. The method of claim 1, wherein after releasing the cluster of spacecraft from the launch vehicle at the first orbit, relative phasing of each spacecraft to each other is about zero degrees.

3. The method of claim 1, wherein separating spacecraft in the cluster of spacecraft from each other comprises:
   causing the spacecraft in the cluster to increase or decrease in altitude in a sequential manner, wherein as a respective spacecraft changes altitude, the respective spacecraft travels in a second orbit (156) incurring a drift resulting in the relative phasing with respect to other spacecraft in the cluster.

4. The method of claim 1, wherein separating spacecraft in the cluster of spacecraft from each other comprises:
   causing a first spacecraft in the cluster to increase or decrease in altitude incurring a drift due to being in a different orbit; and
   causing the first spacecraft in the cluster to stop the change in altitude, once a desired drift rate with respect to other spacecraft in the cluster results, and to travel in a second orbit larger or smaller than the first orbit.

5. The method of claim 1, wherein separating spacecraft in the cluster of spacecraft from each other comprises:
   separating the spacecraft such that only one spacecraft is visible to the ground station at any given time.

6. The method of claim 1, wherein separating spacecraft in the cluster of spacecraft from each other comprises:
   separating the spacecraft in the cluster relative to each other to cause a separation phase from spacecraft to spacecraft.

7. The method of claim 6, wherein the separation phase is about 360/x, where x is a number of spacecraft in the cluster.

8. The method of claim 1, wherein raising each of the spacecraft as separated simultaneously in the synchronized ascent to the respective final orbit comprises:
   sending a timed command to each of the spacecraft, when visible to the ground station, indicating to maneuver to the respective final orbit, wherein the timed command indicates when to begin the maneuver in order to achieve the synchronized ascent and to maintain the relative phasing of each spacecraft to each other.

9. The method of claim 1, wherein raising each of the spacecraft as separated simultaneously in the synchronized ascent to the respective final orbit comprises:
   sending each spacecraft a start time for the synchronized ascent.

10. The method of claim 1, wherein raising each of the spacecraft as separated simultaneously in the synchronized ascent to the respective final orbit comprises:
    simultaneously raising each of the spacecraft from about a same starting orbit, different than the first orbit, with the relative phasing separating each of the spacecraft to each other resulting in the relative phasing remaining once each of the spacecraft arrives at the respective final orbit.

11. The method of claim 1, wherein the ground station is positioned on a surface of Earth and the method further comprises:
    communicating with each spacecraft via a line-of-sight communication; and
    communicating with each spacecraft one at a time.

12. The method of claim 1, wherein separating the spacecraft in the cluster of spacecraft and raising each of the spacecraft as separated simultaneously in the synchronized ascent comprises:
    the ground station individually commanding the spacecraft to separate and then raise.

13. The method of claim 1, wherein the cluster of spacecraft comprises between two to about twelve spacecraft.

14. A non-transitory computer readable storage medium (120) having stored therein instructions (136), that when executed by a system (114) having one or more processors (116), causes the system to perform functions comprising:
    causing spacecraft in a cluster (102) of spacecraft (104, 106, 108, 110) that have been released into a first orbit (140) to separate from each other to minimize overlapping visibility periods from a ground station (114); and
causing each of the spacecraft as separated to raise simultaneously in a synchronized ascent to a respective final orbit (142).

15. The non-transitory computer readable storage medium of claim 14, wherein the functions further comprise:
causing a release of the cluster of spacecraft from a launch vehicle (150) at the first orbit (140) by sending a command to the launch vehicle to release the cluster of spacecraft.

16. The non-transitory computer readable storage medium of claim 14, wherein causing spacecraft in the cluster of spacecraft to separate from each other comprises:
sending a command to each of the spacecraft in the cluster to change in altitude in a sequential manner, wherein as a respective spacecraft changes altitude, the respective spacecraft travels in a second orbit incurring a drift resulting in the relative phasing with respect to other spacecraft in the cluster.

17. The non-transitory computer readable storage medium of claim 14, wherein causing each of the spacecraft as separated to raise simultaneously in the synchronized ascent to the respective final orbit comprises:
sending a command to each spacecraft indicating a start time for the synchronized ascent.

18. A system (100) for deploying a constellation of spacecraft, the system comprising:
a cluster (102) of spacecraft (104, 106, 108, 110) in orbit at a first orbit (140); and
a ground station (114) in communication with spacecraft of the cluster of spacecraft when the spacecraft of the cluster are visible to the ground station, wherein the ground station sends a first command to each spacecraft in the cluster of spacecraft indicating to separate from each other so that relative phasing of each spacecraft to each other minimizes overlapping visibility periods from the ground station, and the ground station sends a second command to each of the spacecraft indicating to raise as separated simultaneously in a synchronized ascent to a respective final orbit (142).

19. The system of claim 18, wherein the ground station sends the first command instructing the spacecraft in the cluster to change in altitude in a sequential manner, wherein as a respective spacecraft changes in altitude, the respective spacecraft travels in a second orbit incurring a drift resulting in the relative phasing with respect to other spacecraft in the cluster.

20. The system of claim 18, wherein the ground station sends the second command instructing each of the spacecraft to maneuver to the respective final orbit and indicating when to begin the maneuver in order to achieve the synchronized ascent and to maintain the relative phasing of each spacecraft to each other.

* * * * *